(12) United States Patent
Kahaei et al.

(10) Patent No.: US 12,119,639 B2
(45) Date of Patent: Oct. 15, 2024

(54) BIPOLAR JUNCTION TRANSISTOR HEATER CIRCUIT

(71) Applicant: Analog Devices International Unlimited Company, Limerick (IE)

(72) Inventors: Aref Kahaei, Cambell, CA (US); James Vincent Sousae, Redwood City, CA (US); Carl T. Nelson, San Jose, CA (US); Robert Dobkin, Monte Sereno, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 18/214,405

(22) Filed: Jun. 26, 2023

(65) Prior Publication Data

US 2023/0352928 A1 Nov. 2, 2023

Related U.S. Application Data

(62) Division of application No. 16/828,336, filed on Mar. 24, 2020, now Pat. No. 11,735,902.

(51) Int. Cl.
*G01K 7/01* (2006.01)
*G06F 1/20* (2006.01)
*H02H 5/04* (2006.01)

(52) U.S. Cl.
CPC ............... *H02H 5/044* (2013.01); *G01K 7/01* (2013.01); *G06F 1/206* (2013.01)

(58) Field of Classification Search
CPC ........ G01K 15/00; G01K 15/005; G01K 7/01; G01K 7/16; G01K 1/16; G01K 13/00; G01K 2217/00; G01K 1/02; G01K 1/026; G01K 1/028; G01K 1/14; G01K 2219/00; G01K 3/005; G01K 7/006; G01K 7/02;
(Continued)

(56) References Cited

U.S. PATENT DOCUMENTS

| 3,983,502 A | 9/1976 | Wheatley, Jr. |
| 4,249,137 A | 2/1981 | Malchow |
| 4,258,311 A | 3/1981 | Tokuda et al. |

(Continued)

FOREIGN PATENT DOCUMENTS

| CN | 108919851 A | 11/2018 | |
| CN | 109189116 A * | 1/2019 | ............ G05D 23/19 |

(Continued)

OTHER PUBLICATIONS

18214405_2024-03-04_JP_H10122976_A_H.pdf, May 15, 1998.*

(Continued)

*Primary Examiner* — Gail Kaplan Verbitsky
(74) *Attorney, Agent, or Firm* — Schwegman Lundberg & Woessner, P.A.

(57) ABSTRACT

An integrated circuit (IC) heater circuit comprises a drive circuit configured to increase the temperature of the IC when consuming power; a temperature sensor coupled to a control node of the drive circuit to activate and deactivate the drive circuit to provide an ambient temperature for the IC, wherein current of the temperature sensor varies with temperature; and a control circuit coupled to the temperature sensor and configured to adjust variation in the temperature sensitivity of the current of the temperature sensor.

17 Claims, 6 Drawing Sheets

(58) Field of Classification Search
CPC ............ G01K 7/21; G01K 7/00; G01K 17/00; G01K 7/015; G01K 7/22; G01K 7/24
See application file for complete search history.

(56) References Cited

U.S. PATENT DOCUMENTS

| | | | | |
|---|---|---|---|---|
| 4,339,707 | A | | 7/1982 | Gorecki |
| 4,342,005 | A | | 7/1982 | Harford |
| 4,366,443 | A | | 12/1982 | Harford |
| 4,675,592 | A | | 6/1987 | Tsuzuki |
| 5,144,405 | A | * | 9/1992 | Naber ................ H01L 27/0211 257/469 |
| 5,581,174 | A | | 12/1996 | Fronen |
| 6,082,115 | A | * | 7/2000 | Strnad .................... F25B 21/04 323/907 |
| 6,342,997 | B1 | * | 1/2002 | Khadkikar ............ G01K 3/005 361/103 |
| 7,703,975 | B2 | | 4/2010 | Kim |
| 9,255,850 | B2 | | 2/2016 | Furuichi |
| 2007/0232505 | A1 | * | 10/2007 | Poirier ................. C10M 169/04 508/421 |
| 2008/0136641 | A1 | * | 6/2008 | Kean ................ G01R 31/31707 257/E23.179 |
| 2009/0046761 | A1 | | 2/2009 | Pan |
| 2013/0121377 | A1 | | 5/2013 | Furuichi |
| 2015/0373876 | A1 | * | 12/2015 | Berke ................ G05D 23/1919 700/282 |
| 2016/0041042 | A1 | | 2/2016 | Pan |
| 2018/0097515 | A1 | * | 4/2018 | Norling ............. H03K 17/0828 |
| 2019/0179352 | A1 | | 6/2019 | Sakurai |
| 2020/0182725 | A1 | | 6/2020 | Matsunami et al. |
| 2021/0305804 | A1 | | 9/2021 | Kahaei et al. |

FOREIGN PATENT DOCUMENTS

| | | | | | |
|---|---|---|---|---|---|
| CN | 109872734 | A | | 6/2019 | |
| CN | 109917846 | A | | 6/2019 | |
| CN | 108319319 | B | | 10/2019 | |
| CN | 110703841 | A | * | 1/2020 | ............ G05F 1/567 |
| CN | 111736641 | A | | 10/2020 | |
| CN | 214202193 | U | | 9/2021 | |
| CN | 115112256 | A | | 9/2022 | |
| DE | 3811949 | A1 | | 10/1989 | |
| DE | 19710829 | A1 | | 9/1998 | |
| EP | 3340467 | A1 | | 6/2018 | |
| JP | S567506 | Y2 | | 2/1981 | |
| JP | S62224059 | A | | 10/1987 | |
| JP | H0457110 | A | | 5/1992 | |
| JP | H05216549 | A | | 8/1993 | |
| JP | H0969739 | A | * | 3/1997 | |
| JP | H10122976 | A | * | 5/1998 | |
| JP | 2000228612 | A | | 8/2000 | |
| JP | 3419274 | B2 | | 6/2003 | |
| JP | 2005283604 | A | | 10/2005 | |
| JP | 2015228771 | A | | 12/2015 | |
| KR | 20100040217 | A | * | 4/2010 | |

OTHER PUBLICATIONS

18214405_2024-03-04_CN_109189116_A_H.pdf,Jan. 11, 2019.*
18214405_2024-03-04_JP_H0969739_A_H.pdf, Mar. 11, 1997.*
18214405_2024-03-04_CN_110703841_A_H.pdf,Jan. 17, 2020.*
18214405_2024-06-25_KR_20100040217_A_H.pdf,Apr. 19, 2010.*
"U.S. Appl. No. 16/828,336 Supplemental Amendment Filed Apr. 1, 2020", 7 pgs.
"U.S. Appl. No. 16/828,336, Non Final Office Action mailed Jan. 3, 2023", 11 pgs.
"U.S. Appl. No. 16/828,336, Notice of Allowance mailed Apr. 20, 2023", 12 pgs.
"U.S. Appl. No. 16/828,336, Response filed Mar. 23, 2023 to Non Final Office Action mailed Jan. 3, 2023", 8 pgs.
"U.S. Appl. No. 16/828,336, Response filed Nov. 15, 2022 to Restriction Requirement mailed Sep. 16, 2022", 8 pgs.
"U.S. Appl. No. 16/828,336, Restriction Requirement mailed Sep. 16, 2022", 5 pgs.

* cited by examiner

BIPOLAR JUNCTION TRANSISTOR HEATER CIRCUIT

CLAIM OF PRIORITY

This application is a Divisional Application of U.S. application Ser. No. 16/828,336, filed Mar. 24, 2020, which is incorporated by reference herein in its entirety.

FIELD OF THE DISCLOSURE

This document relates to integrated circuits and in particular to circuits that heat an integrated circuit die to provide a set temperature for operating the integrated circuit die.

BACKGROUND

Changes in temperature may change operating parameters of integrated circuits. Temperature compensation in circuits is a concern for electronic system designers. Many approaches have been used to achieve insensitivity of circuits to ambient temperature changes.

SUMMARY OF THE DISCLOSURE

This document relates generally to integrated circuits and methods of their operation. In some aspects, an integrated circuit (IC) heater circuit comprises a drive circuit configured to increase the temperature of the IC when consuming power; a temperature sensor coupled to a control node of the drive circuit to activate and deactivate the drive circuit to provide an ambient temperature for the IC, wherein current of the temperature sensor varies with temperature; and a control circuit coupled to the temperature sensor and configured to adjust variation in the temperature sensitivity of the current of the temperature sensor.

In some aspects, a method of operating an IC heater circuit comprises consuming power using a drive circuit of the IC; activating and deactivating the drive circuit using a temperature sensor included in the IC to control temperature of the IC, wherein current of the temperature sensor varies with temperature; and adjusting variation in temperature sensitivity of the current of the temperature sensor using a control circuit included in the IC.

In some aspects, an IC comprises a voltage reference circuit; and an IC heater circuit. The IC heater circuit includes a drive circuit including a resistive circuit load, wherein the drive circuit is configured to increase the temperature of the IC by applying a drive current to the resistive circuit load; a temperature sensor coupled to a control node of the drive circuit to activate and deactivate the drive circuit to produce an ambient temperature for the IC, wherein current of the temperature sensor varies with temperature; and a control circuit coupled to the temperature sensor and configured to adjust variation in the temperature sensitivity of the current of the temperature sensor to reduce variation in the produced ambient temperature.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As explained previously herein, temperature compensation in circuits can be a concern. Many approaches have been used to achieve insensitivity of circuits to ambient temperature changes. In general, previous approaches have attempted to design circuits with operating parameters that are insensitive to changes in temperature. Another approach to address temperature compensation is to stabilize the temperature of the die by including a heater circuit in the die to maintain a steady set-temperature in the die.

Figure 1:
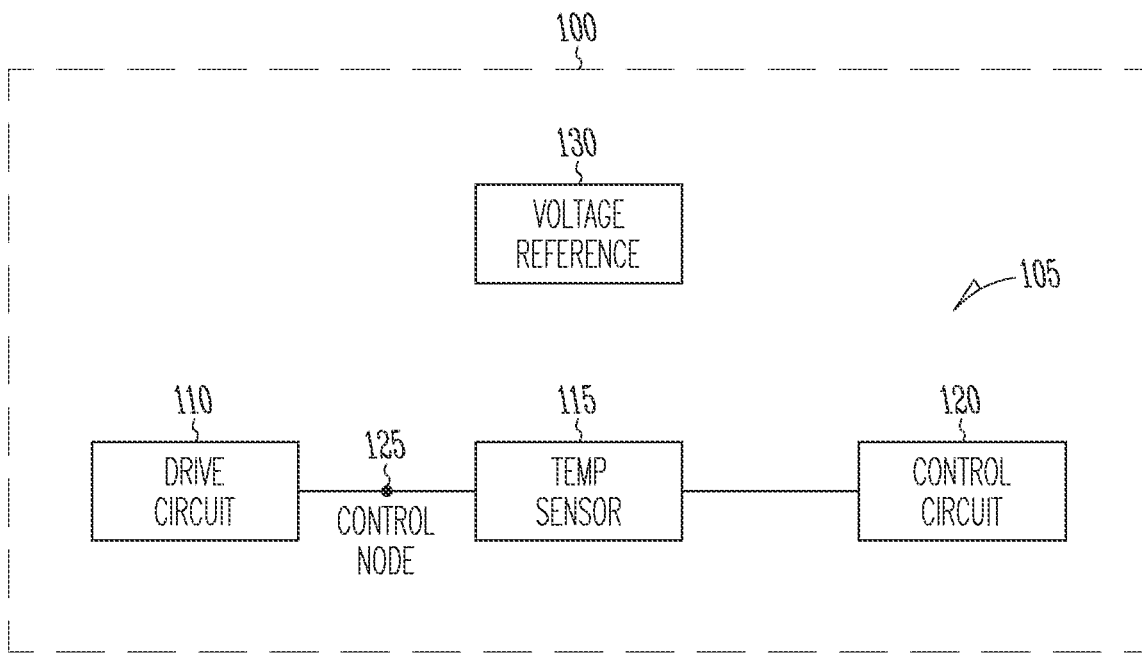
FIG. 1 is a block diagram of a heater circuit for an integrated circuit (IC) in an aspect.

FIG. 1 is a block diagram of an example of an integrated circuit (IC) 100 that includes a heater circuit 105. The heater circuit 105 senses the temperature of the IC and burns just enough power to increase the ambient temperature of the IC to reach the pre-selected set temperature.

The heater circuit 105 includes a drive circuit 110, a temperature sensor 115, and a control circuit 120. The drive circuit 110 increases the temperature of the IC when consuming power. In an example intended to be non-limiting, the drive circuit 110 may apply a drive current to a resistive load to burn power to increase the temperature of the IC.

The temperature sensor 115 is coupled to a control node 125 of the drive circuit 110. The temperature sensor 115 activates and deactivates the drive circuit 110 using the control node 125 to provide an ambient temperature for the IC. In some aspects, the temperature sensor 115 pulls the voltage of the control node 125 towards circuit ground to reduce the drive current generated by the drive circuit 110. Reducing the drive current reduces the power consumed by the drive circuit 110 and reduces the heating produced by the heater circuit 105.

The magnitude of the current of the temperature sensor 115 varies with temperature. This temperature sensitive current can be used to reduce the drive current of the drive circuit with increase in temperature. In some aspects, the temperature sensitive current of the temperature sensor 115 is a pull down current that pulls the control node toward circuit ground to reduce the drive current of the drive circuit. The magnitude of the current may increase with temperature to increase the drive strength of a pull down circuit included in the temperature sensor 115. Thus, the temperature sensor 115 reduces the drive current of the drive circuit as temperature increases and provides negative circuit feedback to the drive circuit 110.

Setting the temperature of the IC 100 allows operating parameters of the IC to be stable without using temperature insensitive circuits. For example, a voltage reference circuit 130 can be included in the IC. Because the set temperature of the IC is known, the voltage reference circuit 130 can be designed to produce the desired voltage reference at the set temperature, and the voltage reference circuit 130 does not need to be designed to provide the desired voltage reference over a range of possible temperatures.

A challenge of controlling the heater circuit 105 using a temperature sensor 115 is achieving an accurate set temperature. Temperature sensitivity of the temperature sensor 115 can vary with process. The process variation may cause too much variation in the resulting set temperature of the heater circuit. This may cause too much variation in circuit operating parameters such as the reference voltage.

To resolve variation in temperature sensitivity, the control circuit 120 adjusts variation in the temperature sensitivity of the current of the temperature sensor with the result that the pre-chosen set temperature of the heater circuit is achieved despite changes in variation of temperature sensitivity due to variation in process.

Figure 2:
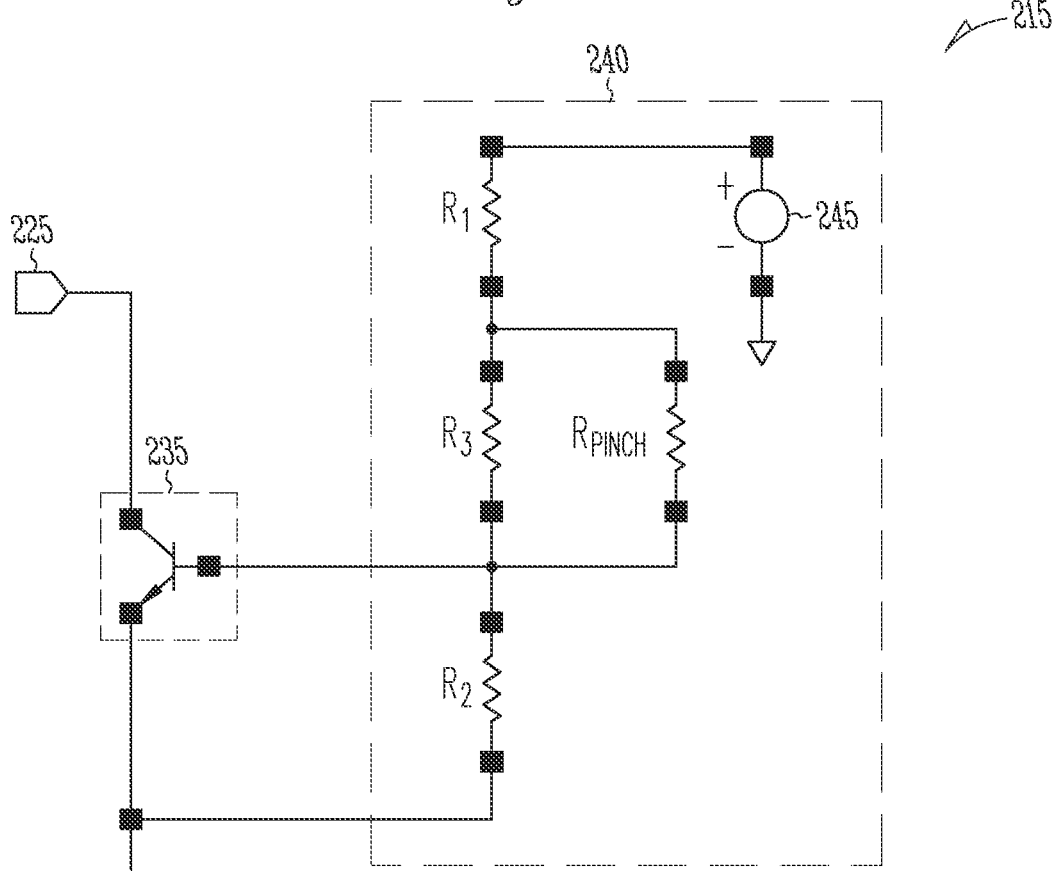
FIG. 2 is a circuit diagram of a circuit for a temperature sensor in an aspect.

FIG. 2 is a circuit diagram of an example of a circuit for a temperature sensor 215. The temperature sensor 215 includes a bipolar junction transistor (BJT) 235 coupled to the control node 225 of the drive circuit that provides a pull down current at the collector region that varies with temperature to the control node 225. The temperature sensor 215 senses the temperature and causes the drive circuit to burn just enough power to heat the IC to reach the set temperature.

The temperature sensor circuit 215 includes a control circuit. The control circuit includes a bias circuit 240 configured to apply a bias voltage to a base region of the BJT 235. The base emitter voltage ($V_{BE}$) is used to set the current at the collector to control the drive circuit.

Upon circuit startup, the BJT 235 will be off at first because the forced $V_{BE}$ voltage applied to it is not large enough at a lower temperature to conduct and pull down the collector coupled to the control node 225. This causes the drive circuit connected to the control node to be fully on at startup until the burned power increases the temperature of the die and the BJT 235 is turned on. When the BJT 235 turns on, the BJT collector pulls down on the control node until the power being burned in the drive circuit is just enough for the circuit to stabilize and maintain a fixed set-temperature.

The current at the collector of the BJT 235 ($I_C$) can be expressed as $$I_C = I_{SS}(e^{V_{BE}/V_T}).$$

where $I_{SS}$ is the saturation current of the BJT 235. The set temperature of the IC heater circuit is determined by the $I_{SS}$ of the BJT 235 and the forced $V_{BE}$ applied to the BJT 235. The $I_{SS}$ in turn varies with temperature. If the $V_{BE}$ is fixed, the current at the collector of the BJT will vary with temperature. A challenge is that the $I_{SS}$ of a BJT 235 varies over process and this means the set temperature of the IC heater circuit also varies with process. In some IC applications the uniformity of the set temperature can be very important.

An approach to address unwanted variation in set temperature is to vary the $V_{BE}$ bias to offset the variation in temperature sensitivity of $I_{SS}$. The variation in $I_{SS}$ can be compensated by the forced $V_{BE}$ not being a fixed voltage, but instead a voltage that also varies with process. The variation in $V_{BE}$ should vary inversely with the variation in $I_{SS}$ of the BJT 235 so that the bias voltage provided by the bias circuit varies temperature inversely with the variation in inversely with the pull down current provided by the BJT 235.

In the temperature sensor example of FIG. 2, the bias circuit 240 includes a resistive divider circuit that generates the bias voltage at the base region of the BJT from a stable voltage (e.g., $V_{DC}$ 245). The resistive divider circuit includes a pinch resistor (Rpinch) having a resistance value that varies with temperature in a way that tracks the change in $I_{SS}$ of the BJT 235.

Because the resistance of the pinch resistor value tracks $I_{SS}$, if $I_{SS}$ is less than nominal for the BJT 235, the resistance of the pinch resistor will also be less than nominal, and this will increase the value of the forced $V_{BE}$ produced by the bias circuit. If $I_{SS}$ of the BJT 235 is higher than nominal, the resistance of the pinch resistor will move in the other direction to decrease the value of the forced $V_{BE}$. This compensation of $V_{BE}$ helps to achieve a tighter set-temperature distribution for the IC heater circuit despite process variations.

Figure 3:
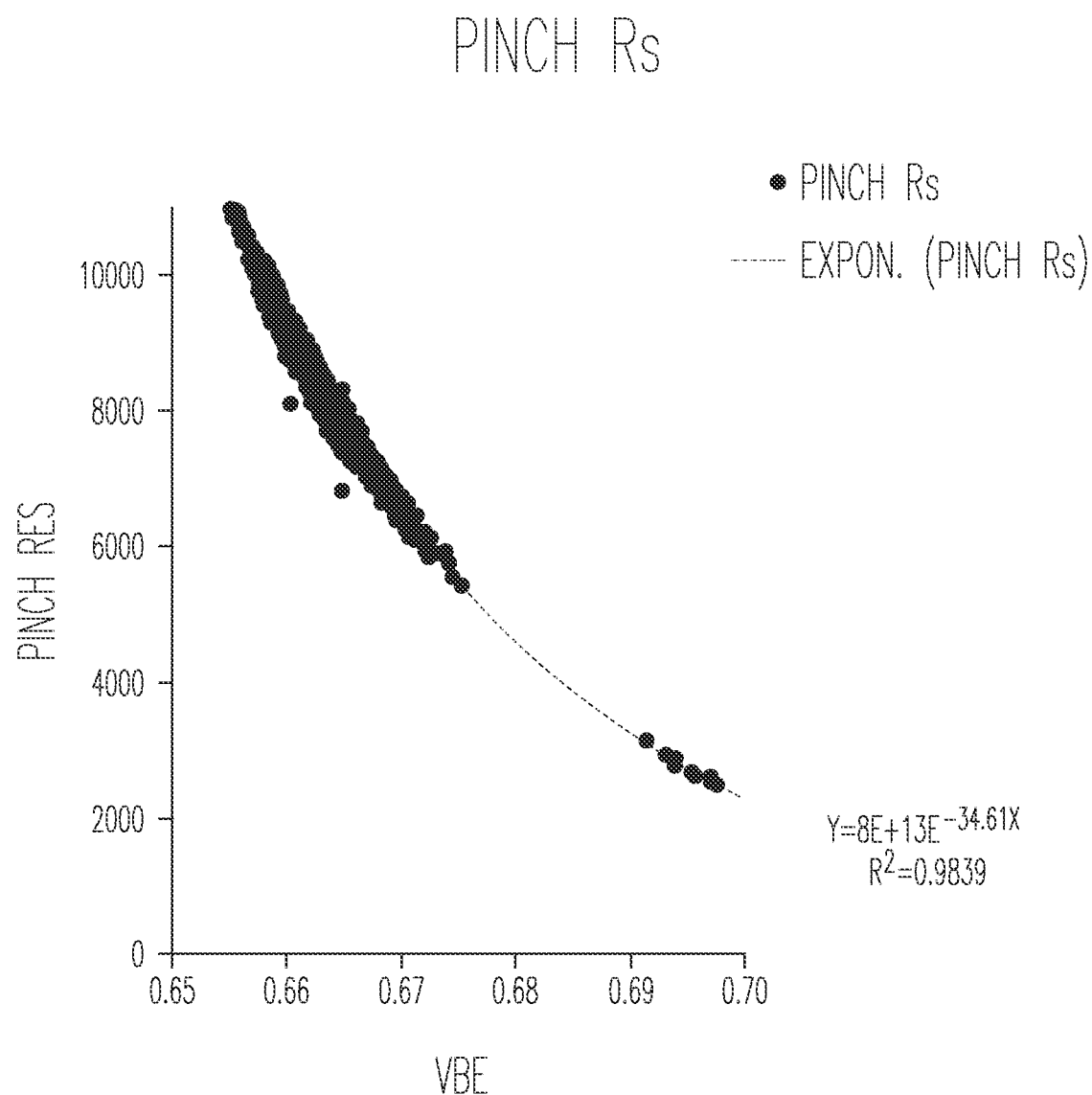
FIG. 3 is a plot of resistance of a pinch resistor and the value of a base voltage of a transistor of a temperature sensor in an aspect.

FIG. 3 is a plot of resistance of a pinch resistor and the value of $V_{BE}$. When the resistance value of the pinch resistor is high, the bias voltage $V_{BE}$ is lower, and when the resistance value is low the $V_{BE}$ is higher. Because the resistance value tracks $I_{SS}$, the graph also shows the correlation of $I_{SS}$ and $V_{BE}$. When $I_{SS}$ is higher, the bias voltage $V_{BE}$ is lower to compensate for the higher $I_{SS}$ and return the temperature sensitivity of the BJT collector current to nominal. And when $I_{SS}$ is lower, the $V_{BE}$ is higher to compensate for the lower $I_{SS}$ to provide nominal temperature sensitivity for the collector current.

Figure 4A:
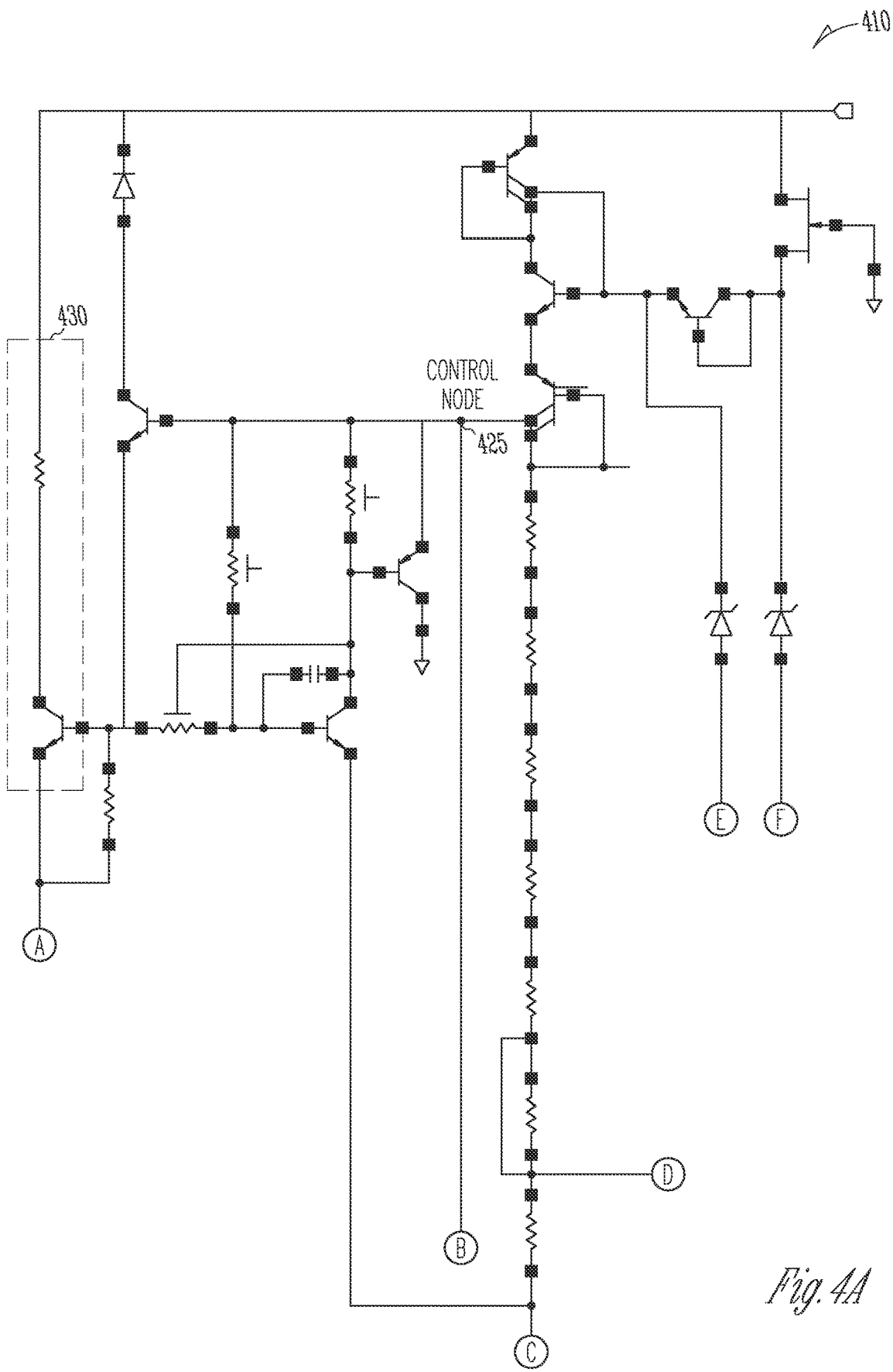
FIGS. 4A-4B contain a circuit diagram of a drive circuit for an IC heater circuit in an aspect.
Figure 4B:
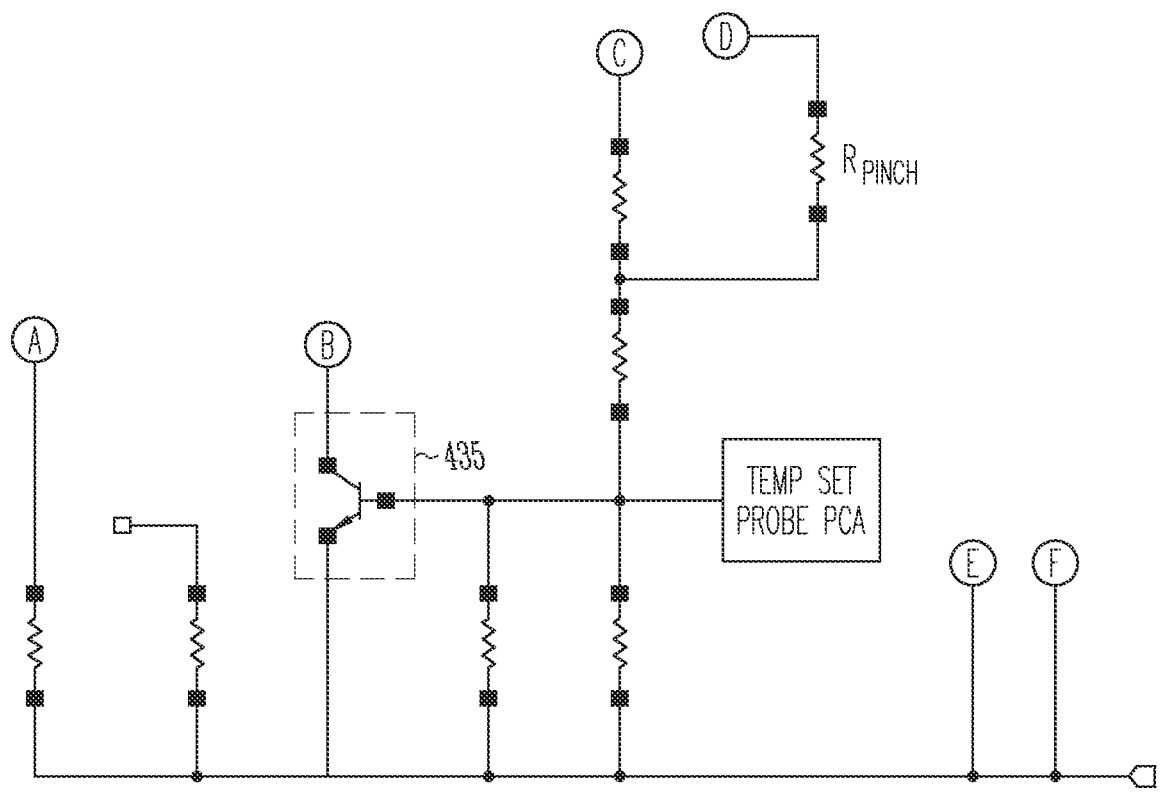

FIGS. 4A-4B contain a circuit diagram of an example of a drive circuit 410 of an IC heater circuit. The drive circuit 410 includes a resistive circuit 430 as a circuit load. The drive circuit 410 applies a drive current to the resistive circuit to burn power to increase the temperature of the IC. The drive circuit 410 includes a control node 425. Transistor 435 and pinch resistor (Rpinch) are included in a temperature sensor circuit that adjusts the voltage of the control node 425 to adjust the drive current applied to the resistive circuit 430, and thereby adjusts the amount of power consumed by the drive circuit 410 to adjust the temperature of an IC.

Figure 5:
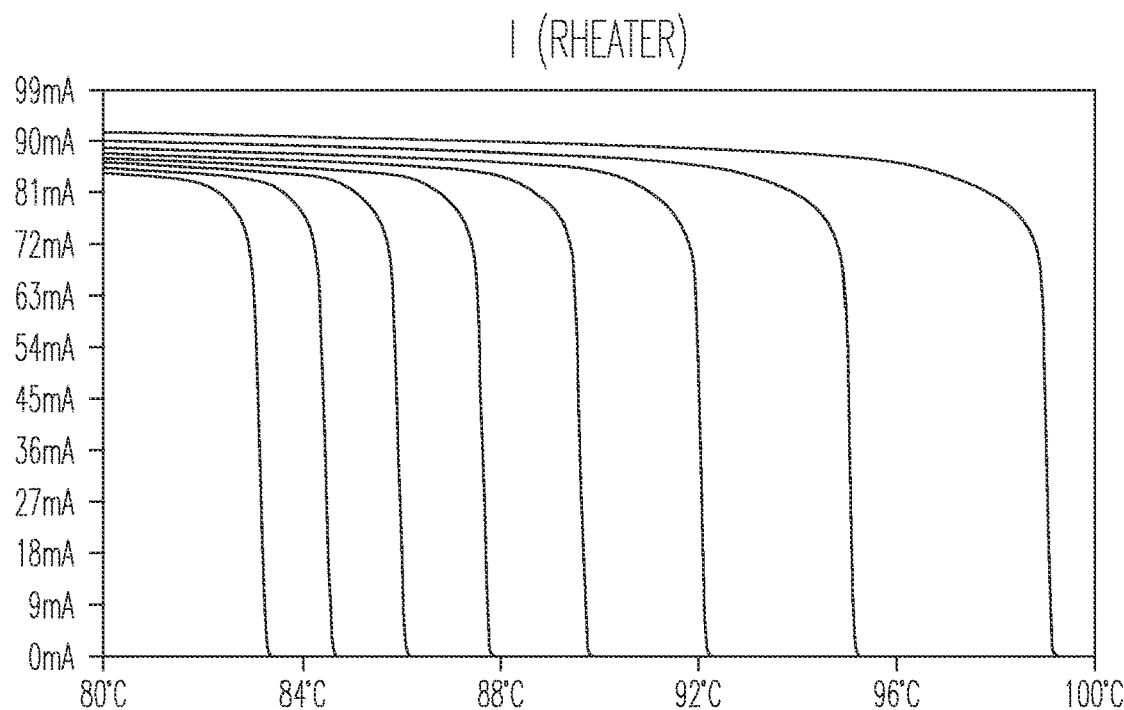
FIGS. 5 and 6 are plots showing the variation in set temperature for two difference temperature sensor circuits.
Figure 6:
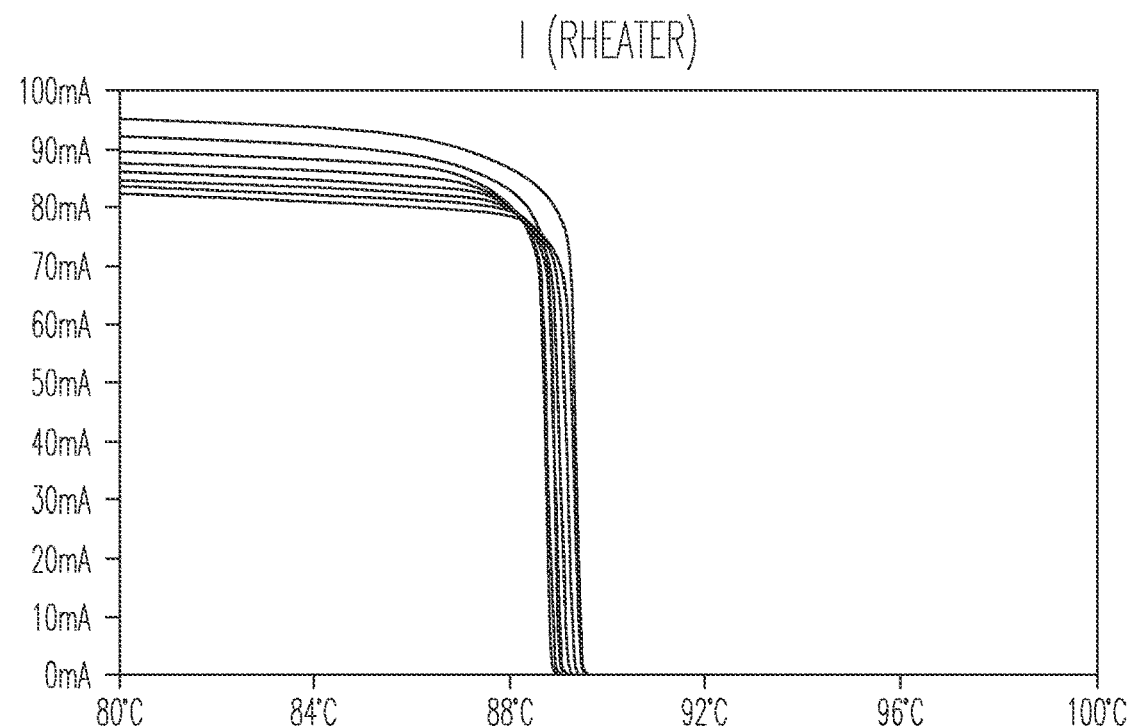

FIG. 5 is a plot showing the variation in set temperature for the IC heater circuit when a bias circuit without a pinch resistor is used to bias the BJT. The set temperature varies over a range from about 83° C. to 99° C. FIG. 6 is a plot showing variation in set temperature when a bias circuit with a pinch resistor is used to bias the BJT. The set temperature is tightened to about 89° C.

The specific set temperature may be set by design of the BJT and the nominal value of $V_{BE}$. The value of the set temperature of the heater circuit decreases by roughly 9° C. when the size of the BJT is doubled. The value of the set temperature increases by 9° C. when the bias current of the BJT is doubled. Once the BJT is designed to select the desired set temperature, the base voltage bias $V_{BE}$ can be adjusted to compensate for process variation in set temperature.

Figure 7:
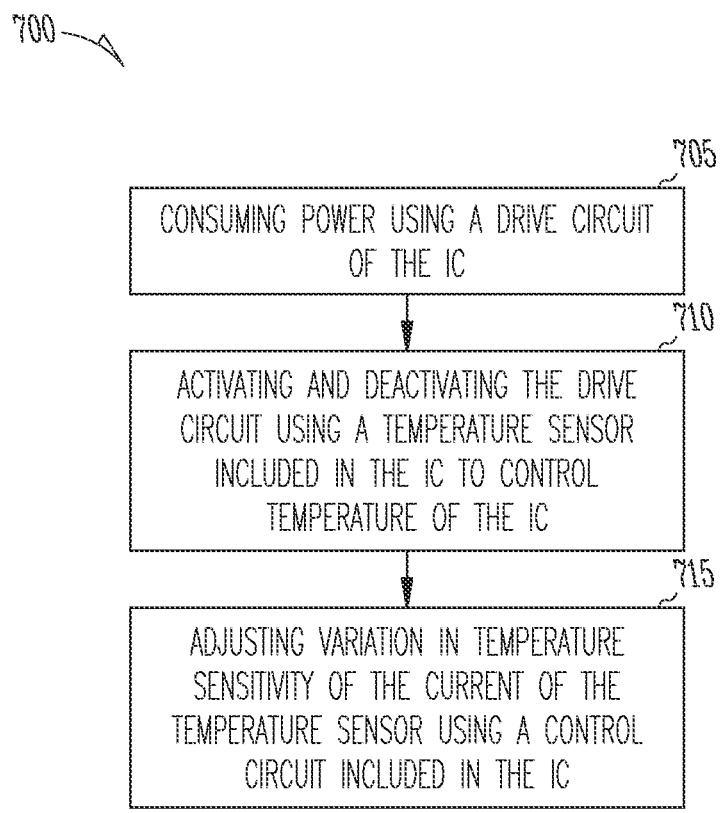
FIG. 7 is a flow diagram of an example of a method of operating an IC heater circuit.

FIG. 7 is a flow diagram of a method 700 of operating an IC heater circuit. At 705, power is consumed using a drive circuit of the IC to raise the temperature of the IC. This can be accomplished by applying a current to a resistive circuit load or by operating another type of IC circuit to produce heat.

At 710, the drive circuit is controlled by a temperature sensor included in the IC to activate and deactivate the drive circuit. In some aspects, a current of the temperature sensor varies with temperature, and the current is used to reduce the drive current applied by the drive circuit.

At 715, variation in temperature sensitivity of the current of the temperature sensor is adjusted using a control circuit included in the IC. In some aspects, the temperature sensor includes a transistor to provide the current to control the drive circuit. The control circuit provides a bias voltage to the transistor that tracks temperature inversely to the sensor current to compensate for variation in temperature sensitivity of the temperature sensor.

It can be seen that the devices and methods described herein overcome the limitations of conventional approaches to temperature compensation of integrated circuits.

Additional Description and Aspects

A first Aspect (Aspect 1) can include subject matter (such as an integrated circuit (IC) heater circuit) comprising a drive circuit configured to increase the temperature of the IC when consuming power; a temperature sensor coupled to a control node of the drive circuit to activate and deactivate the drive circuit to provide an ambient temperature for the IC, wherein current of the temperature sensor varies with temperature; and a control circuit coupled to the temperature sensor and configured to adjust variation in the temperature sensitivity of the current of the temperature sensor.

In Aspect 2, the subject matter of Aspect 1 optionally includes a temperature sensor configured to provide a pull down current that increases with temperature to the control node of the drive circuit; and a control circuit that includes a bias circuit configured to apply a bias voltage to a base region of the BJT, and the bias circuit is configured to vary the bias voltage of the bias circuit with temperature inversely to the pull down current of the BJT.

In Aspect 3, the subject matter of one or both of Aspects 1 and 2 optionally includes a temperature sensor that includes a bipolar junction transistor (BJT) coupled to the control node of the drive circuit that provides a pull down current that varies with temperature to the control node; and a control circuit includes a bias circuit configured to apply a bias voltage to a base region of the BJT, and the bias circuit is configured to vary the bias voltage of the bias circuit with temperature inversely to the pull down current of the BJT.

In Aspect 4, the subject matter of Aspect 3 optionally includes a bias circuit includes a pinch resistor having a resistance that varies with temperature.

In Aspect 5, the subject matter of Aspect 3 optionally includes a resistive divider circuit configured to generate the bias voltage at the base region of the BJT, and the resistive divider circuit includes a pinch resistor having a resistance that varies with temperature and the bias voltage generated by the resistive divider circuit varies inversely to a temperature variation of a component of the pull down current of the BJT.

In Aspect 6, the subject matter of Aspect 5 optionally includes the component of the pull down current of the BJT is a saturation current of the BJT and the BJT is sized to produce a saturation current that controls the drive circuit to heat the IC to a specified temperature that is within the range of eighty to one hundred degrees Celsius (80° C.-100° C.).

In Aspect 7, the subject matter of one or any combination of Aspects 1-6 optionally includes a resistive circuit. The drive circuit is configured to apply a drive current to the resistive circuit to increase the temperature of the IC, and the temperature sensor is configured to reduce the drive current of the drive circuit with increase in temperature.

Aspect 8 can include subject matter (such as a method of operating an IC heater circuit) or can optionally be combined one or any combination of Aspects 1-7 to include such subject matter, comprising consuming power using a drive circuit of the IC; activating and deactivating the drive circuit using a temperature sensor included in the IC to control temperature of the IC, wherein current of the temperature sensor varies with temperature; and adjusting variation in temperature sensitivity of the current of the temperature sensor using a control circuit included in the IC.

In Aspect 9, the subject matter of Aspect 8 optionally includes providing a pull down current to a control node of the drive circuit using the temperature sensor, wherein the pull down current of the temperature sensor increases with temperature; and providing circuit feedback to the temperature sensor that varies inversely with the pull down current of the temperature sensor.

In Aspect 10, the subject matter of one or both of Aspects 8 and 9 optionally includes providing a pull down current to a control node of the drive circuit using a bipolar junction transistor (BJT) included in the temperature sensor circuit, wherein the pull down current of the BJT varies with temperature; and forcing a bias voltage at a base region of the BJT to vary with temperature inversely with the pull down current of the BJT using the control circuit.

In Aspect 11, the subject matter of Aspect 10 optionally includes setting the bias voltage of the base region of the BJT using a bias circuit that includes a pinch resistor having a resistance that varies with temperature proportional to the pull down current of the BJT.

In Aspect 12, the subject matter of Aspect 10 optionally includes setting the bias voltage of the base region of the BJT using a bias circuit that includes a resistive divider configured to generate the bias voltage using a circuit supply voltage; and varying the bias voltage inversely to the temperature variation in pull down current using a pinch resistor included in the resistive divider circuit.

In Aspect 13, the subject matter of one or any combination of Aspects 8-12 optionally includes turning on the drive circuit before turning on the BJT upon a circuit startup, and the bias voltage generated by the bias circuit is less than a turn on voltage of the BJT at the circuit startup.

In Aspect 14, the subject matter of one or any combination of Aspects 8-13 optionally includes driving current through a resistive load of the drive circuit to increase temperature of the IC; and activating and deactivating the control node of the drive circuit using the temperature sensor to increase and decrease the current through the resistive load.

Aspect 15 includes subject matter (such as an IC) or can optionally be combined with one or any combination of Aspects 1-14 to include such subject matter, comprising a voltage reference circuit and an IC heater circuit. The IC heater circuit includes a drive circuit including a resistive circuit load, wherein the drive circuit is configured to increase the temperature of the IC by applying a drive current to the resistive circuit load; a temperature sensor coupled to a control node of the drive circuit to activate and deactivate the drive circuit to produce an ambient temperature for the IC, wherein current of the temperature sensor varies with temperature; and a control circuit coupled to the temperature sensor and configured to adjust variation in the temperature sensitivity of the current of the temperature sensor to reduce variation in the produced ambient temperature.

In Aspect 16, the subject matter of Aspect 15 optionally includes a temperature sensor configured to provide a pull down current that increases with temperature to the control node of the drive circuit; and a control circuit configured to provide circuit feedback to the temperature that varies inversely with the pull down current of the temperature sensor.

In Aspect 17, the subject matter of one or both of Aspects 14 and 15 optionally includes a temperature sensor including a bipolar junction transistor (BJT) coupled to the control node of the drive circuit that provides a pull down current to the control node that varies with temperature; and a control circuit including a bias circuit configured to apply a bias voltage to a base region of the BJT, and the bias circuit is configured to vary the bias voltage of the bias circuit with temperature inversely to the pull down current of the BJT.

In Aspect 18, the subject matter of Aspect 17 optionally includes a bias circuit including a pinch resistor having a resistance that varies with temperature inversely with the pull down current of the BJT.

In Aspect 19, the subject matter of Aspect 17 optionally includes a bias circuit includes a resistive divider circuit configured to generate the bias voltage at the base region of the BJT, wherein the resistive divider circuit includes a pinch resistor having a resistance that varies with temperature inversely with a component of the pull down current of the BJT.

In Aspect 20, the subject matter of one or any combination of Aspects 17-19 optionally includes a drive circuit that turns on before the BJT transistor upon a circuit startup, and the bias voltage generated by the bias circuit is less than a turn on voltage of the BJT at the circuit startup.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples" or "aspects." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method of operating an integrated circuit (IC) heater circuit, the method comprising:
   consuming power using a drive circuit of the IC;
   activating and deactivating the drive circuit using a temperature sensor included in the IC to control temperature of the IC, wherein deactivating the drive circuit includes providing a pull down current to a control node of the drive circuit using a bipolar junction transistor (BJT) included in the temperature sensor circuit, and the pull down current of the BJT varies with temperature; and
   adjusting the variation in temperature sensitivity of the current of the temperature sensor including forcing a bias voltage at a base region of the BJT to vary with temperature inversely with the pull down current of the BJT using the control circuit.

2. The method of claim 1,
   wherein the adjusting the variation in the temperature sensitivity of the current of the temperature sensor includes providing circuit feedback to the temperature sensor that varies inversely with the pull down current of the temperature sensor.

3. The method of claim 1, wherein adjusting the variation in temperature sensitivity of the current of the temperature sensor includes setting the bias voltage of the base region of the BJT using a bias circuit that includes a pinch resistor having a resistance that varies with temperature proportional to the pull down current of the BJT.

4. The method of claim 1, wherein adjusting the variation in temperature sensitivity of the current of the temperature sensor includes:
   setting the bias voltage of the base region of the BJT using a bias circuit that includes a resistive divider configured to generate the bias voltage using a circuit supply voltage; and
   varying the bias voltage inversely to the temperature variation in pull down current using a pinch resistor included in the resistive divider circuit.

5. The method of claim 1, including turning on the drive circuit before turning on the BJT upon a circuit startup, and the bias voltage generated by the bias circuit is less than a turn on voltage of the BJT at the circuit startup.

6. The method of claim 1,
   wherein consuming power using a drive circuit of the IC includes driving current through a resistive load of the drive circuit to increase temperature of the IC; and wherein the activating and deactivating the control node of the drive circuit using the temperature sensor increases and decreases the current through the resistive load.

7. A method of operating an integrated circuit (IC) heater circuit, the method comprising:
consuming power using a drive circuit of the IC;
activating and deactivating the drive circuit using a temperature sensor included in the IC to control temperature of the IC, wherein current of the temperature sensor varies with temperature;
providing a pull down current to a control node of the drive circuit using a bipolar junction transistor (BJT), wherein a size of the BJT determines a set temperature of the IC and the activating and deactivating the drive circuit sets ambient temperature of the IC to the set temperature; and
adjusting variation in temperature sensitivity of the current of the temperature sensor using a control circuit included in the IC.

8. The method of claim 7, including producing a reference voltage on the IC according to the set temperature.

9. The method of claim 7, wherein the adjusting the temperature sensitivity of the current includes setting a collector current of the BJT using a base emitter voltage ($V_{BE}$) of the BJT to control the drive circuit, wherein a process variation in the base emitter voltage varies inversely with a process variation in saturation current of the BJT.

10. The method of claim 7, wherein the adjusting the temperature sensitivity of the current includes setting a collector current of the BJT using a resistive circuit element of the IC to control the drive circuit, wherein a process variation in the resistive circuit element tracks the process variation in saturation current of the BJT.

11. The method of claim 7, wherein consuming power using a drive circuit of the IC includes driving a resistive circuit of the IC using current of the drive circuit to heat the IC.

12. The method of claim 7, including:
the control circuit providing, to the temperature sensor, circuit feedback that varies inversely with the pull down current of the temperature sensor.

13. An integrated circuit (IC) temperature setting circuit, the IC temperature setting circuit comprising:
a drive circuit to consume power when activated;
a temperature sensor configured to activate and deactivate the drive circuit to set the IC to an operating set temperature, wherein the temperature sensor includes a bipolar junction transistor (BJT) configured to provide a pull down current to a control node of the drive circuit to deactivate the drive circuit, wherein the pull down current of the BJT varies with temperature; and
a control circuit configured to force a bias voltage at a base region of the BJT to vary with temperature inversely with the pull down current of the BJT.

14. The IC temperature setting circuit of claim 13, wherein the control circuit includes a bias circuit to set a bias voltage of the base region of the BJT, wherein the bias circuit includes a pinch resistor having a resistance that varies with temperature proportional to the pull down current of the BJT.

15. The IC temperature setting circuit of claim 13, wherein the control circuit includes a bias circuit to set a bias voltage of the base region of the BJT, wherein the bias circuit includes a resistive divider configured to generate the bias voltage using a circuit supply voltage, and vary the bias voltage inversely to the temperature variation in pull down current using a pinch resistor included in the resistive divider circuit.

16. The IC temperature setting circuit of claim 13,
wherein the drive circuit is configured to turn on before the BJT during a circuit startup, and
wherein the control circuit includes a bias circuit to set a bias voltage of the base region of the BJT, and the bias voltage is less than a turn on voltage of the BJT.

17. The IC temperature setting circuit of claim 13,
wherein the drive circuit provides current through a resistive load of the drive circuit to increase temperature of the IC; and
wherein the temperature sensor is configured to increase and decrease the current through the resistive load by the activating and deactivating of the control node of the drive circuit.

* * * * *